United States Patent [19]

Sypula et al.

[11] 4,272,600

[45] Jun. 9, 1981

[54] MAGNETIC TONERS CONTAINING CUBICAL MAGNETITE

[75] Inventors: Donald S. Sypula; Cornelius B. Murphy, both of Fairport, N.Y.

[73] Assignee: Xerox Corporation, Stamford, Conn.

[21] Appl. No.: 110,075

[22] Filed: Jan. 7, 1980

[51] Int. Cl.³ .............................................. G03G 9/00
[52] U.S. Cl. ................................. 430/106; 430/107; 430/109; 430/111; 430/99; 430/120; 430/124; 430/126; 430/904; 252/62.51; 252/62.53; 252/62.54; 252/62.56
[58] Field of Search ................ 430/106, 99, 107, 120, 430/111, 903, 124, 904, 126, 109; 252/62.51, 62.53, 62.54, 62.56

[56] References Cited

U.S. PATENT DOCUMENTS

| | | |
|---|---|---|
| 3,839,029 | 10/1974 | Berg . |
| 3,900,588 | 8/1975 | Fisher . |
| 4,035,810 | 7/1977 | Blossey . |
| 4,038,665 | 7/1977 | Neukermans . |
| 4,105,572 | 8/1978 | Gorondy ............................. 430/106 |
| 4,142,981 | 3/1979 | Bean .................................... 430/111 |

FOREIGN PATENT DOCUMENTS

| | | | |
|---|---|---|---|
| 14815 | 12/1977 | Australia ............................. 430/111 |
| 565656 | 11/1958 | Canada ................................ 430/107 |

Primary Examiner—Mary F. Downey
Attorney, Agent, or Firm—H. M. Brownrout; P. H. Kondo; E. O. Palazzo

[57] ABSTRACT

This invention is generally directed to magnetic toners comprised of a styrene butadiene copolymer resin, and a cubically shaped magnetite material, which toners have a fusing latitude range of at least 30 degrees Fahrenheit up to a maximum temperature of 390 degrees Fahrenheit. Toners having melt fusing temperatures of from about 300 degrees Fahrenheit to about 375 degrees Fahrenheit are desirable. The preferred cubical magnetite used is Mapico Black, which is present in amounts of from about 40 percent to about 70 percent. The toners of the present invention are useful for example in magnetic imaging systems, especially systems employing heat pressure fusing and high speed fusing systems.

9 Claims, No Drawings

MAGNETIC TONERS CONTAINING CUBICAL MAGNETITE

BACKGROUND OF THE INVENTION

This invention relates generally to new magnetic toners and the use of such toners for developing images. More specifically, the present invention is directed to magnetic toners containing styrene-butadiene resins.

In the electrophotographic process, especially the xerographic process, and in magnetic imaging systems similar steps are involved in causing the formation and development of images, including for example the formation of a latent image, the development of the latent image with electroscopic materials, such as toner, optionally, transferring the developed image to a suitable support such as paper, fusing the image to the paper substrate using a number of known techniques, including those employing heat, and optionally cleaning the surface from which the developed latent image has been transferred. In the xerographic process, the photoconductive surface or plate which contains an electrostatic latent image can be developed by means of a variety of pigmented resin materials specifically made for this purpose, such as toners. The toner material is electrostatically attracted to the latent image on the plate in proportion to the charge concentration thereon. These toner materials can be applied by a number of known techniques including for example, cascade development, see U.S. Pat. No. 3,618,552, magnetic brush development, see U.S. Pat. No. 2,874,063, and touchdown development, see U.S. Pat. No. 3,166,432. The developed image is then transferred to a suitable substrate such as paper, and can be fixed by using a number of different techniques including for example vapor fixing, heat fixing, pressure fixing or combinations thereof as described for example in U.S. Pat. No. 3,539,161.

In magnetic imaging systems substantially the same process steps are involved as described above with respect to electrophotographic imaging systems, thus there is formed a latent magnetic image on a magnetizable recording medium, which image can be used in duplicating processes, for example, by repetitive toning and transfer of the developed image. The latent magnetic image is formed by any suitable magnetization procedure whereby a magnetized layer of marking material is magnetized, and such magnetism transferred imagewise to the magnetic substrate; or where the magnetization pattern is applied directly to the magnetic substrate by a record head, or similar device. The latent magnetic image can be developed with a magnetic developer usually toner with a magnetic pigment to render such image visible. The developed visible magnetic image can then be typically transferred to a receiver such as for example a sheet of paper, which image is fused on the paper in order to produce a final copy or print referred to in the art as a hard copy. There are a number of known techniques for creating the latent image which are described for example in U.S. Pat. Nos. 4,032,923, 4,060,811, 4,074,276, 4,030,105, 4,035,810, 4,101,904, and 4,121,261, the teachings of these patents being completely incorporated herein by reference.

One method of developing magnetic images is referred to as magnetic toner touchdown development, which involves providing a substantially uniform layer of toner comprising magnetic material on a conductive substrate, which material can be brought either closely adjacent to that of the image or in contact with the image. The magnetic material in the toner acts as an extension of the conductive backing and therefore acquires charge, induced therein by the latent image of a polarity opposite to that of the latent image. The conductive substrate can be biased to assist in transfer of the toner to the latent image, however, a conductive backing is not essential.

Typical suitable fusing methods that may be used have been described in the prior art and include for example, heating the toner and the developed image to cause the resins thereof to at least partially melt, and become adhered to the photoconductor binder member, or copy substrate, in the case of images transferred from the imaging media followed by the application of pressure to the toner with heating such as the use of a heated roller. Solvent or solvent vapor fusing has also been used, wherein the resin component of the toner is partially dissolved. The photoconductor binder member or copy substrate is typically of sufficient hardness to allow fixing solely by the application of pressure such as for example by a contact roller and in an amount sufficient to calender the toner. With some existing toner materials images are fixed using a heat pressure fusing system at surface speeds of up to 20 inches per second but recently it has been found desirable to achieve fixing speeds up to at least 50 inches per second and special toner materials are needed in order to effect such high fixing speeds particularly in magnetic systems where the high magnetic pigment loading required for development can have an adverse effect on the desired fusing level of the toner.

Concurrently with the growth of interest in magnetic imaging there was developed encapsulated ferrofluids in a magnetic recorded medium, wherein the ferrofluid orientation in the presence of a magnetic field exhibits a variable light responsive characteristic. In this situation the magnetic recording medium is self-developing in the sense that magnetic marking material need not be employed to render a visible image. In other situations latent magnetic images are rendered visible by magnetic marking material. Thus, for example, in U.S. Pat. No. 3,627,682 there is disclosed binary toners for developing latent magnetic images, which binary toners include a particulate hard magnetic material and a particulate soft magnetic material in each toner particle. The toner particles include two materials in a binder material. In U.S. Pat. No. 2,826,634 there is described the use of iron or iron oxide particles either alone or encapsulated in low melting resin or binders for developing latent magnetic images.

Other patents evidencing the continuing interest in improved magnetic mediums include U.S. Pat. No. 3,520,811, which discloses that magnetic particles of chromium dioxide appear to catalyze a surface polymerization or organic air drying film forming vehicles such as those employed in oil base materials in order that a coating of polymerized vehicle is formed around the particle; and U.S. Pat. No. 3,905,841 which teaches the prevention of agglomeration and the formation of homogeneous dispersions of colbalt-phosphorous particles into an organic resin binder by treatment with a solution containing sulfuric acid.

SUMMARY OF THE INVENTION

It is an object of this invention to provide improved magnetic toners.

Another object of the present invention is the provision of magnetic toners useful in magnetic imaging systems.

Yet another object of this invention is to provide magnetic tones useful in high speed fusing systems.

A further object of this invention is the provision of magnetic toners containing relatively high loadings of certain magnetite materials.

These and other objects of the present invention are accomplished by providing new magnetic toners, which are particularly useful in heat pressure fusing, and high speed fusing systems, these toners being comprised of a styrene-butadiene copolymer resin, and a substantially cubically shaped magnetite material, which toners have a fusing temperature latitude range of at least 30 degrees Fahrenheit up to a maximum measurable temperature of 390 degrees Fahrenheit.

The resin employed in the toner composition of the present invention is a styrene-butadiene copolymer which has from about 75 percent to about 95 percent of styrene and from about 25 percent to about 5 percent of butadiene with the preferred amount of styrene being 85 to 90 percent, and the preferred amount of butadiene being 10 to 15 percent, the total amount of styrene plus butadiene being equal to 100 percent. Thus, when 90 percent of styrene is present, 10 percent of butadiene is present. The preferred styrene-butadiene copolymer material is commercially available as Pliolite®S-5E from Goodyear Chemical Corporation.

Various different types of cubically shaped magnetites can be combined with the styrene-butadiene resin to form the toner of the present invention. Illustrative examples of cubical shaped magnetites include Mapico Black, commercially available from Columbian Division, Cities Services, Inc., Akron, Ohio, and the like. The preferred cubical magnetite useful in the present invention is Mapico Black. By using a cubical magnetite with the styrene-butadiene copolymer resin described herein, excellent fusing results were obtained, and the toner is jettable, that is, it does not have to be prepared by spray dry processes.

The amount of cubical magnetite present ranges from about 40 percent to about 70 percent by weight, and preferably from about 45 percent to about 65 percent by weight of toner, with the amount of styrene-butadiene resin being present ranging from about 60 percent to about 30 percent, and preferably from about 55 percent to about 35 percent. The total amount of cubical magnetite plus styrene-butadiene resin is equal to about 100 percent, thus, when 70 percent by weight of the cubical magnetite is present, 30 percent by weight of the styrene-butadiene resin is present, which allows one to achieve good development and fusing at high speeds, that is, approaching 35 to 50 inches per second in a preferred embodiment. In one preferred embodiment of the present invention at least 45 percent by weight of cubical magnetite is present, especially when the toner of the present invention is used in high speed fusing devices, for example, speeds of from about 20 inches per second, to about 50 inches per second.

The toners of the present invention have a minimum fusing latitude equal to or greater than 30 degrees Fahrenheit (°F.) as illustrated in the table. The minimum fusing latitude range temperature and the minimum fuse temperature, especially the minimum fuse temperature is important and critical. Superior and efficient fixing of the toner on a substrate such as paper results with lower minimum fuse temperatures. Thus, generally, a minimum fuse temperature of about 330° F., (60 percent Pliolite®,40 percent Mapico Black) will result in better fixing of the toner material, than when the toner has a minimum fix temperature of greater than 390° F. Inefficient fixing of the toner will adversely effect the quality of the resulting image, in that the image will not be clear, nor will it be readable. A melt fusing temperature of 400° F. or greater, for the toner, would render it substantially impractical for use, since for example, such a temperature will adversely effect other machine parts.

The toners of the present invention can be prepared by various known methods, including jetting which is preferred, and spray drying. Jetting is a well known process, reference U.S. Pat. No. 3,965,021, and generally involves the generation of small toner particles, less than 20 microns in diameter in some instances, by impaction of such particles in an air stream. In the spray drying method the styrene-butadiene copolymer is dissolved in an organic solvent such as toluene or chloroform. The cubical magnetic pigment is added to the solvent. Vigorous agitation, such as that obtained by ball milling processes assists in insuring good dispersion of the pigment. This solution is then pumped through an atomizing nozzle while using an inert gas such as nitrogen, as the atomizing agent. The solvent evaporates during atomization, resulting in the desired magnetic toner particles. Particle size of the resulting toner varies depending on the size of the nozzle, however, particles of a diameter between about 0.1 microns and about 100 microns generally are obtained. Melt blending or dispersion processes can also be used for preparing the toner compositions of the present invention. This involves melting a powdered form of the copolymer resin, and mixing it with a cubical magnetite. The resin can be melted by heated rolls, which rollers can be used to stir and blend the resin. After thorough blending the mixture is cooled and solidified. The solid mass that results is broken into small pieces and subsequently finely ground by impaction in an air stream (jetting or attriting) so as to form free flowing magnetic toner, which range in size of from 0.1 to about 100 microns.

Other methods for preparing the toners of the present invention include dispersion polymerization, emulsion polymerization and melt blending/cryogenic grinding, and the preferred method, jetting.

DESCRIPTION OF THE PREFERRED EMBODIMENTS

The following examples further define and describe the toner compositions of the present invention and methods for preparing such toner compositions. Parts and percentages are by weight unless otherwise indicated.

Fusing results obtained using various magnetic toners are outlined in the following table. Configuration A refers to a hard roll heated fuser roll, while configuration B refers to a soft roll heated fuser roll. Hard roll, and soft roll heated fuser rolls are known; generally, however, a hard roll is comprised of a metal core, such as copper coated with a thin layer of a fluorocarbon polymer, such as Teflon, commercially available from E. I. duPont Company, while a soft roll fuser is comprised of a metal core, such as copper, coated with a conformable material such as soft rubber. A soft fuser roll generally allows better contact between the fuser roll and the toner.

MFT°F—represents the minimum fuse temperature, in degrees Fahrenheit; and is the minimum temperature at which the toner material melts and sticks to a substrate such as paper.

HOT°F—represents the hot set-off temperature, in degrees Fahrenheit; and is the temperature at which some toner adheres to the fuser roll used in an electrophotographic system.

Fl°F—represents the fusing latitude range, in degrees Fahrenheit; and is the difference in degrees Fahrenheit, between the hot set-off temperature, and the minimum fuse temperature.

(1) Volume average particle size=7.5 microns
(2) volume average particle size=11.3 microns
(3) volume average particle size=15.0 microns Pliolite ® is a copolymer of a styrene-butadiene resin, 90 percent styrene, 10 percent butadiene commercially available from Goodyear Chemical.

MO4232 is a magnetite, commercially available from Pfizer Pigment Co., New York, New York.

K-378 is a magnetite commercially available from Northern Pigments Co., Toronto, Ontario, Canada.

MB is a cubical Mapico Black magnetite commercially available from Columbian Division, Cities Services, Inc., Akron, Ohio.

>—is the symbol for greater than while ~ is the symbol for approximately, and % is the symbol for percentage.

TABLE OF FUSING DATA
FOR PLIOLITE BASED MAGNETIC TONERS

| Toner Composition (Wt. %) | Configuration | MFT (°F.) | HOT(°F.) | Fl(°F.) |
|---|---|---|---|---|
| 35% Pliolite/65% MO4232 | A | >390 | >390 | |
| 35% Pliolite/65% K-378 | A | ~390 | >390 | |
| 25% Pliolite/75% MB | A | >390 | >390 | |
| 35% Pliolite/65% MB | A | ~350 | ~380 | ~30 |
|  | B | ~325 | >390 | >65 |
| 40% Pliolite/60% MB | A | ~330 | >390 | >60 |
| 45% Pliolite/55% MB | A | ~340 | >390 | >50 |
|  | B | ~305 | >390 | >85 |
| 55% Pliolite/45% MB | A | ~340 | >390 | >50 |
| 60% Pliolite/40% MB | A | ~330 | >390 | >60 |
| 35% Pliolite/65% MB (1) | B | ~310 | >390 | >80 |
| 35% Pliolite/65% MB (2) | B | ~325 | >390 | >65 |
| 35% Pliolite/65% MB (3) | B | ~350 | >390 | >40 |

Referring to the above Table, a toner composition comprised of 35 percent Pliolite ®, and 65 percent of MO4232, had a minimum melt fusing temperature of greater than 390° F., therefore, such a toner is undesirable as it will not fuse to a substrate such as paper thereby resulting in toner images of low quality, while a toner composition comprised of 40 percent Pliolite ®, and 60 percent of Mapico Black (MB), had a melt fusing temperature of about 330° F. and a fusing latitude of greater than 60 degrees Fahrenheit, which is very desirable. Melt fusing temperatures of from about 300° F. have been found to be desirable. Similar results are shown with other toner compositions. Also as indicated in the Table, with a soft heated fuser roll, increasing the volume average toner particle size from 7.5 microns to 15 microns resulted in a decrease in fusing latitude from greater than 80 degrees Fahrenheit, to greater than 40 degrees Fahrenheit. This most likely occurs because of the larger amount of heat required to soften the larger toner particles. High loading of magnetite, that is, greater than 70% such as 75%, reference Table, 25% Pliolite, 75% MB, resulted in an undesirable melt fusing temperature.

The toners of the present invention can be used to develop magnetic images, employing magnetic image systems as described herein, and as illustrated for example, in the Background of the Invention. In one magnetic imaging method, the magnetic latent image is formed on a suitable substrate, followed by contacting the image with a toner composition of the present invention, transferring the developed image to a suitable substrate, and permanently affixing the image thereto by fusing.

DESCRIPTION OF THE PREFERRED EMBODIMENTS

The following examples further define and describe the toner compositions of the present invention and methods for preparing such toner compositions, parts and percentages being by weight unless otherwise indicated.

EXAMPLE I

A toner comprised of 35 parts by weight of a styrene-butadiene copolymer resin, 90 percent styrene, 10 percent butadiene, and 65 parts by weight of the cubical magnetite, Mapico Black commercially available from Columbian Chemical Division of Cities Service, was prepared by jetting, as described in U.S. Pat. No. 3,965,021 where there is generated small toner particles of about 10 microns in diameter, by impaction in an air stream. This toner with configuration A had melt fuse temperature of about 350° F. and a fusing latitude of about 30° F. as shown in the Table, while with configuration B the toner had a melt fusing temperature of 325° F., which is a further improvement.

This toner when used in a magnetic imaging system for developing magnetic images, produced toner images of uniform high optical density and excellent resolution.

EXAMPLE II

The procedure of Example I was repeated with the exception that the toner material was comprised of 40 parts by weight of resin, and 60 parts by weight of Mapico Black. The resultant toner had a melt fusing temperature of about 330° F., and a fusing latitude temperature of greater than 80 ° F.

This toner when used in a magnetic imaging system for developing magnetic images produced toner images of uniform high optical density, and excellent resolution.

EXAMPLE III

The procedure of Example I was repeated with the exception that the toner material was comprised of 55 parts by weight of the styrene-butadiene resin, and 45 parts by weight of Mapico Black. This toner had a fusing latitude of greater than 50° F., and a melt fusing temperature of about 340° F.

This toner when used in a magnetic imaging system for developing magnetic images produced toner images of uniform high optical density, and excellent resolution.

EXAMPLE IV

The procedure of Example I was repeated with the exception that the resin used was comprised of 85 percent styrene, and 15 percent butadiene. The resulting toner had a fusing latitude of greater than 35° F.

This toner when used in a magnetic imaging system for developing magnetic images, produced toner images of uniform high optical density and excellent resolution.

Other modifications of the present invention will occur to those skilled in the art based upon a reading of the present application, and these are intended to be included within the scope of the invention.

What is claimed is:

1. A method for developing magnetic latent images by causing the formation of a magnetic latent image on a suitable substrate, followed by contacting the image with a dry magnetic toner comprised of a copolymer resin of styrene-butadiene, which copolymer contains form about 75 percent to about 95 percent styrene, and the cubical magnetite, Mapico black, present in an amount of from about 40 percent to about 70 percent by weight of toner which toner has a fusing temperature latitude range of at least 30 degrees Fahrenheit, up to a maximum temperature of 390 degrees Fahrenheit, followed by transferring the developed image to a suitable substrate, and permanently affixing the image thereto by fusing.

2. A method in accordance with claim 1, wherein the copolymer resin contains from about 75 percent to about 95 percent styrene, and the magnetic material is present in an amount of from about 40 percent, to about 70 percent by weight of toner.

3. A method in accordance with claim 1, wherein the copolymer resin is comprised of 90 percent styrene, and 10 percent butadiene.

4. A method in accordance with claim 1 wherein the cubical magnetite is Mapico Black.

5. A method in accordance with claim 1 wherein the fusing temperature latitude is greater than 50 degrees Fahrenheit.

6. A dry magnetic toner resin comprised of a copolymer of a styrene butadiene resin, which copolymer contains from about 75 percent to about 95 percent styrene, and the cubical magnetite Mapico black, said toner having a fusing temperature latitude range of at least 30 degrees Fahrenheit up to a maximum temperature of 390 degrees Fahrenheit, the Mapico black being present in an amount of from about 40 percent to about 70 percent by weight of the toner.

7. A toner in accordance with claim 1 wherein the copolymer resin contains from about 75 percent to about 95 percent styrene and the magnetite is present in an amount of from about 40 percent, to about 70 percent by weight of toner.

8. A toner in accordance with claim 1, wherein the fusing temperature latitude is greater than 50 degrees Fahrenheit.

9. A toner composition in accordance with claim 1 wherein the toner has a melt fusing temperature range of from about 300 degrees Fahrenheit to about 375 degrees Fahrenheit.

* * * * *

UNITED STATES PATENT AND TRADEMARK OFFICE
CERTIFICATE OF CORRECTION

PATENT NO. : 4,272,600
DATED : June 9, 1981
INVENTOR(S) : Cornelius B. Murphy, et al.

It is certified that error appears in the above-identified patent and that said Letters Patent are hereby corrected as shown below:

Please cancel Claims 2, 4, and 7, without prejudice.

In Claims 8, and 9, subsequent to the word "Claim", replace the number "1", with the number "6".

Signed and Sealed this

Eighth Day of March 1983

[SEAL]

Attest:

Attesting Officer

GERALD J. MOSSINGHOFF

Commissioner of Patents and Trademarks